United States Patent [19]

Schroeder et al.

[11] Patent Number: 5,054,654

[45] Date of Patent: Oct. 8, 1991

[54] COMBINATION ICE AND CHILLED BEVERAGE DISPENSER

[76] Inventors: Alfred A. Schroeder, 2811 Whisper Fawn, San antonio, Tex. 78230; Samuel Durham, 3539 Oakhorne, San Antonio, Tex. 78247; Robert W. Niedheiser, 14310 Stoddard, San Antonio, Tex. 78232

[21] Appl. No.: 436,915

[22] Filed: Nov. 14, 1989

[51] Int. Cl.[5] .......................... F25C 1/00; G01F 11/28

[52] U.S. Cl. .................................. 222/146.6; 222/239; 222/241

[58] Field of Search ................................ 222/640-641, 222/643, 129.1, 146.6, 227, 236, 237-239, 242, 240-241, 410, 413; 62/233, 137, 344

[56] References Cited

U.S. PATENT DOCUMENTS

| | | | |
|---|---|---|---|
| 3,592,366 | 7/1971 | Markley et al. | 222/242 |
| 3,874,559 | 4/1975 | Pink | 222/146.6 |
| 4,555,045 | 11/1985 | Rodth et al. | 222/1 |
| 4,641,763 | 2/1987 | Landers et al. | 222/129.1 |
| 4,679,715 | 7/1987 | Hovinga | 222/517 |
| 4,787,539 | 11/1988 | Uchida et al. | 222/639 |
| 4,921,149 | 5/1990 | Miller et al. | 222/639 |

OTHER PUBLICATIONS

Trade publication distributed by SerVend International, Inc., Form No. 2170, Copyright 1988.

*Primary Examiner*—Michael S. Huppert
*Attorney, Agent, or Firm*—Donald R. Comuzzi

[57] ABSTRACT

An apparatus for dispensing both ice and chilled beverages, and more particularly an improved chilled beverage dispenser which has large ice storage capacity and which incorporates an improved system of dispensing ice. The improved ice storage and dispensing system utilizes a circular rotating tray and an intermediate cone chute to dispense ice efficiently in combination with chilled beverage dispensing and maximizes all available space that can possibly be used to store ice within an enclosure.

13 Claims, 4 Drawing Sheets

COMBINATION ICE AND CHILLED BEVERAGE DISPENSER

BACKGROUND OF THE INVENTION

This invention relates to apparatus for dispensing both ice and chilled beverages, and more particularly, but not by way of limitation, to an improved chilled beverage dispenser which has large ice storage capacity and which incorporates an improved system of dispensing ice.

Available space is a valuable commodity in small convenience stores, cafeterias, concession stands, fast food service lines and the like. The relevant industry sets certain size and dimensional requirements based on practical limitations of service counter size and the ease of everyday operation and routine maintenance. The industry is constantly looking for improved apparatus which take up less counter space while delivering the same or increased levels of efficiency. Small, compact machines, facilitating the delivery of food service and suitable for service counters of set and limited dimensions, are constantly in demand. One such demand has been for a combination ice and beverage dispenser. Ice in chilled beverages has become a necessary part of modern-day food service, and a combined ice and chilled beverage dispenser, logically, increases efficiency in food service delivery by eliminating the need for two separate machines and by making more counter space available.

U.S. Pat. No. 4,641,763, issued to Landers et al., discloses one such effort in which an ice storage bin can provide ice for beverages, at the same time providing a cooling source for a cold plate which, in turn, chills beverage lines. This disclosure is typical of the state of art prior to the present invention. The apparatus disclosed by Landers is limited in the capacity of stored ice (practically about 90 lbs.) because the bottom level of ice in the storage bin has to be above the height level of the discharge chute for the force of gravity to allow discharge of ice into cups waiting below. Thus, the free space from the lowest portion of the machine to the height level of the bottom layer of ice is wasted and unusable for ice storage.

U.S. Pat. No. 4,679,715, issued to Hovinga, discloses a rotary paddle wheel which is used in a combination ice cube and cold beverage dispenser to elevate ice from lower regions of a storage cabinet up to a dispensing chute. Ice is elevated to roughly the same level as that of the dispensing chute, and the entire storage cabinet, along with all of its internal components, is designed at a tilted angle to allow gravity-assisted dispensing. Because of this sloped design, the paddle wheel is limited to a relatively small size. The size of the wheel is further restricted by a separate enclosure that is a part of the wall of the ice cabinet which is required for the wheel to be able to carry ice within the enclosure's confinement.

The entire design restricts the amount of ice that can be stored within the cabinet which is limited by the height and width demands of the food service industry. The volume of ice in the cabinet is further restricted by addition of a curved false bottom which is designed to create a separate compartment for ice to cool a cold plate. Furthermore, the small size to which the paddle wheel is confined results in inefficient ice delivery as it is restricted to the small amounts of ice that reach it through the tilt angle and narrow channels formed in the opening to its separate enclosure.

A trade publication distributed by SerVend International, Inc., Form No. 2170, copyright 1988, discloses an ice dispenser that also utilizes a paddle wheel. Like the Hovinga patent, the internal ice bin and the paddle wheel system design disclosed in the SerVend brochure is tilted at an angle with wasted dead space below the slanted bottom of the ice storage bin. The SerVend ice dispenser could be combined with a beverage dispenser; however, this would create problems very similar to the restricted volumes found in the storage cabinet of the Hovinga patent.

Another drawback of the SerVend paddle wheel is the delivery of ice up to the apex of the paddle wheel for discharge down a dispensing chute. If this method of dispensing ice is to be incorporated with a beverage dispenser, the industry would demand that the length of drop from the apex of the paddle wheel to beverage containers waiting below be enclosed within a relatively long discharge chute. This will result in wasted ice as conventional beverage holders cannot hold the volume of ice discharged by this excessively long discharge chute.

The present invention discloses an apparatus which allows for almost double the capacity of ice storage (around 160 lbs.), as compared to machines presently available, by incorporating a novel rotating tray which lifts ice stored below the height of the discharge chute to an elevation above said chute and then into a secondary cone chute for gravity-assisted dispensing. This design allows the rotating tray to reach throughout the entire height of the ice storage bin with utilization of the entire volume of the bin while still dispensing proper volumes of ice at appropriate height levels.

It is an object of the present invention to provide enlarged ice storage bins for combination chilled beverage and ice dispensers. To this end, the system disclosed herein incorporates a rotating tray means which allows for storage of ice below the height level of the discharge chute, permitting the use of the free space below the level of the discharge chute which would otherwise be wasted.

It is an object of this invention to provide a combination beverage and ice dispenser which efficiently discharges ice in quantities corresponding to volumes of conventional beverage holders through the use of a cone chute located at an intermediate height along the dispenser. The rotating tray means of the present invention has the ability to reach the lowest portions of its storage bin, utilizing all available storage space in the bin, and can discharge ice at an elevation that meets the demands of the industry without waste caused by excessive discharge.

Another object of the present invention is to provide a rotating tray means, a plurality of breaker bars, and a plurality of agitators, all mounted on a single, motor-driven shaft such that all separate components mounted on the shaft rotate in unison when the motor is activated. Rotation of the shaft and agitators can also be timed for set periods at set time intervals through printed circuit board means to prevent bridging of ice stored for long durations.

Another object is to provide an ice-dispensing apparatus whose internal components are strippable without tools for cleaning and maintenance, which allows for improved sanitation control.

It is a further object of the present invention to provide insulation for chilled beverage lines beyond an ice-cooled cold plate through additional insulation with foamed-in-place insulation of product lines beyond the cold plate.

Other objects and improvements will be apparent to those skilled in the art in the following disclosure.

SUMMARY OF THE INVENTION

The apparatus of the present invention is basically a combination chilled beverage and ice dispenser integrated with a storage bin for ice. The storage bin is covered at an uppermost portion with a removable lid. The preferred embodiment is designed to allow an operator to remove the lid and fill the bin with ice made in an independent ice-making source at a different location. The removable lid can be replaced with an adapting means which allows for the mounting of an ice maker directly onto the uppermost portion of the ice storage bin. However, the invention allows for large ice storage capacity and the preferred embodiment is designed for use by the majority of the industry which uses ice makers that are separate and independent from the beverage dispenser.

Once ice has been filled in the storage bin, the lid is replaced on the top of the apparatus, which deactivates an interlock switch mechanism and reactivates the electric circuit, allowing safe, injury-free operation of the internal components of the machine. The dispensing of ice begins with activation of a touch-sensitive microvoltage membrane switch which signals a printed circuit board ("P.C. board"). Pre-programmed logic on the P.C. board activates an electric motor while simultaneously prompting a solenoid means to lift a trap door located within an external ice discharge chute. Lifting of the trap door permits the discharge of ice down the discharge chute into beverage holders placed below.

The simultaneous activation of the electric motor begins the rotation of an internal shaft connected to the motor. The internal shaft is mounted with a circular rotating tray, a plurality of breaker bars, and a plurality of agitators. Rotation of the shaft rotates the plurality of agitators which breaks up the stored ice in the bin outside the rotating tray and pushes the ice slowly forward into pockets located inside the rotating tray. The ice-laden pockets of the rotating circular tray carry ice upward in a circular motion, like a ferris wheel, and drop their contents into a stationary cone chute situated in the inner circumference of the circular tray through a cut-out portion located on an upper quadrant of the stationary cone chute. Once inside the stationary cone chute, rotating breaker bars mounted on the shaft inside the confines of the cone chute break up the ice therein, which prevents jamming, and further pushes the ice towards a wall chute.

The wall chute connects the cone chute to the external discharge chute through the insulated front wall of the ice storage bin. The wall chute and the external discharge chute are separated by a trap door. Once ice reaches the wall chute, gravity allows it to slide through the open trap door and into the discharge chute. When electric contact on the membrane switch is released, the solenoid, through a deactivating signal from the P.C. board, simultaneously closes the trap door and shuts off the electric motor which stops the rotation of the internal shaft. This terminates the dispensing of ice.

The P.C. board is also pre-programmed to rotate the shaft independently of the trap door. In normal operation, ice is not continuously dispensed over time and the apparatus can remain idle for extended periods. A common problem which occurs with stored ice left unagitated over an extended duration is the formation of fusion bridges between adjacent pieces of ice caused by minute melting of the surface areas of the ice. To prevent this formation of clumped ice, the P.C. board is pre-programmed to turn the shaft, through activation of the electric motor, for one revolution every set time period when the machine remains idle. This breaks up any bridging in the stored ice without releasing the trap door and facilitates ice discharge when needed.

As mentioned earlier, the rotation of the shaft rotates the plurality of agitators which breaks up the stored ice in the bin. A problem currently encountered with similar agitators on the market is the fusion of ice to the surface of the stainless steel agitators caused by minute melting on the surface of the stored ice pieces, very similar to the bridging mentioned above. This freezing of clumped ice onto agitators creates a tremendous drag on the motor attempting to turn the ice laden agitators on the internal shaft. The present invention overcomes this problem by coating the shaft and agitators with a poor thermal conducting material which acts to prevent the freezing of ice onto these components.

In addition to poor thermal conduction, the coating material should also be resistant to drag by the ice so that after coating with the material, the surface of the shaft and agitators are "slick" and allows them to slice through the stored ice with reduced resistance. TEFLON is an example of such coating material with these desired properties. Epoxy coating is another example and is more economical in application. These examples are not given by way of limitation, and any material which can be applied as coating with similar properties is encompassed within the spirit of this disclosure.

The circular rotating tray of the preferred embodiment is of a single-piece molded construction which makes its manufacture simple and economical since assembly of separate component parts is not required. The tray has a plurality of wedge-shaped pocket compartments which are individually separated by vanes that rise perpendicularly from a circular base. The cone chute is designed to fit into the centermost portion of the circular base such that the vanes form vertical walls on the rotating tray, the circular base forms the floor for the pockets, and the rim of the cone chute completes a plurality of enclosures in the form of the wedge-shaped pockets. The diameter of the tray is of sufficient length such that the full height of the ice bin can be reached for ice retrieval, including the lowermost regions of the bin. Furthermore, the tray is at a 90-degree angle in relation to the floor of the ice bin and avoids a slanted design of the interior of the bin, utilizing all available space within the bin.

The circular base of the rotating tray has a plurality of punched-out edges which form openings. An opening is created for each wedge-shaped pocket compartment which allows for communication between the storage bin and the interior of the pocket compartments. The agitators are designed to push ice forward into these openings at a horizontal angle, which avoids the need for a slanted tilt of the interior storage space and the associated dead spaces that would be created by the inclination.

The relevant food service industry requires service counter apparatus, such as the present invention, to be approximately 36 inches tall for use on conventional counter tops. This allows an operator to dispense chilled beverages out of the machine at a convenient height, which is approximately midway from the bottom to the top of the machine, around 18 inches from the level of the counter. Thus, the discharge chute for ice has to also be located at a similar height level to avoid inefficient and unnecessary lifting and lowering of cups to adjust to different heights between ice and beverage dispensing points.

The majority of currently available combination ice and beverage dispensers have ice storage compartments which bottom out at this midway level because that is the minimum height at which ice can be dispensed using the pull of gravity. By utilizing the rotating tray of the present invention, ice can be stored below the midway level, allowing for a larger capacity of ice storage. The rotating tray lifts ice up from the lower regions below midway level to a height sufficient for dispensing above the midway level.

Conventional ice dispensers available on the market can carry ice upward from below the height level of the discharge chute to a point above it for gravity discharge. However, efforts prior to the present invention elevate ice to excessive heights, creating large drop chutes which cause wasteful pile-ups of ice that overflow from cups too small to handle such a volume. In the present invention, ice is carried to the apex of the rotating tray and deposited down into a separate cone chute located roughly at the midway level. The cone chute negates the need for an excessively long discharge chute, thus preventing needless waste of ice. The volume of the cone chute allows for the containment of only an optimum amount of ice to be dispensed into beverage containers waiting below.

The breaker bars located within the confines of the cone chute, the rotating tray, and agitators located in the storage bin are all mounted on a single shaft. All these elements, including the shaft itself, are removable and replaceable without tools. All component pieces mounted to the shaft are held together by pins which are easily disengaged manually. The National Sanitation Foundation has released a study which states that an increase in the use of tools in the clean-up and maintenance of dispensing apparatus used by the food service industry increases the likelihood of opportunistic infections that could harm the health of consumers. Thus, the ability to break down the internal workings for cleaning without tools reduces the possibility of the spread of communicable diseases.

The circular rotating tray of the present invention need not be confined to the single-piece molded construction of the preferred embodiment. Another embodiment is of a two piece construction wherein the first piece is a circular tray of a single-piece molded construction which is mounted onto the interior of the front wall of the dispenser such that a circular flange portion extends from the first piece into the interior of the ice storage bin. The second piece is also of single-piece molded construction which has a plurality of vanes rising perpendicularily from a circular base portion forming a plurality of paddles at ninty-degree angles with said base portion.

As in the preferred embodiment, the cone chute is designed to fit into the centermost portion of the circular base of the second piece such that when the second piece is mounted onto the first piece an enclosure is formed therebetween with a plurality of wedge-shaped pockets disposed within this enclosure. The wedge-shaped pockets are formed by the plurality of paddles of the second piece forming vertical walls seperating the pockets, the circular tray of the first piece forming the floor, the circular base portion of the second piece forming the roof, and the flange extending from the first piece and the rim of the cone chute completing the outer circular walls.

The diameter of the tray of the second embodiment is also of sufficient length such that the full height of the ice storage bin can be reached for ice retrieval, including the lowermost portions of the bin. Like the preferred embodiment, the tray of the second embodiment is at a 90-degree angle in relation to the floor of the storage bin when mounted onto the interior front wall of the bin, which avoids a slanted design and enables the utilization of all available space within the bin. The circular base portion of the second piece of the second embodiment has a plurality of punched-out edges which form openings. An opening is created for each wedge-shaped pocket compartment which allows for communication between the storage bin and the interior of the pocket compartments. The agitators are designed to push ice forward into these openings at a horizontal angle.

The present invention also incorporates a cold plate located at the lowermost portion of the ice storage bin. Beverage syrup and soda lines (collectively "product lines") are formed in situ within aluminum or like-metal blocks which comprise the cold plate. The cold plate, which forms the lowermost portion of the ice storage bin, is cooled by the ice within the storage bin. Thus, the storage bin serves the dual purpose of both cooling the product lines, by extracting heat from the cold plate, and providing ice to be dispensed. Within the storage bin, a layer of ice is allowed to sit undisturbed over the cold plate. The lowermost portion of the rotating tray and the tips of the agitators are designed with tolerances such that a layer of ice remains unagitated immediately over the cold plate.

This layer of ice need not be suitable for discharge since its purpose is to cool the cold plate and chill the product lines. It is actually preferable for the agitators to not disturb this bottom layer since the constant extraction of heat from the cold plate allows for the ready formation of fusion bridges between ice pieces which make this bottom layer of ice relatively more difficult to break up than the upper layers.

Once chilled within the cold plate, the product lines extend upward to beverage-dispensing valves located on the outer face of the apparatus. Since the benefits of the cold plate do not extend as far up as the level of the dispensing valves, a volume of beverage which may remain in the product line beyond the cold plate may warm up if the dispenser is not used in high frequency (this is referred to as the problem of warming up of the "occasional drink"). To resolve this problem, the present invention also incorporates product lines insulated with foam beyond the cold plate. This allows for the dispensing of chilled "occasional drinks" even if it is left in the product lines beyond the cold plate. The product lines extending beyond the cold plate are "foamed-in-place" within foaming fixtures with suitable chemical mixtures to form foam insulation around the product lines after leaving the chilled metal of the cold plate. This allows for the consistent dispensing of chilled beverages independent of the frequency of discharge from the dispensing valves.

Other objects, features and advantages of this invention will become evident in light of the following description of the invention.

DETAILED DESCRIPTION OF THE INVENTION

Figure 1:
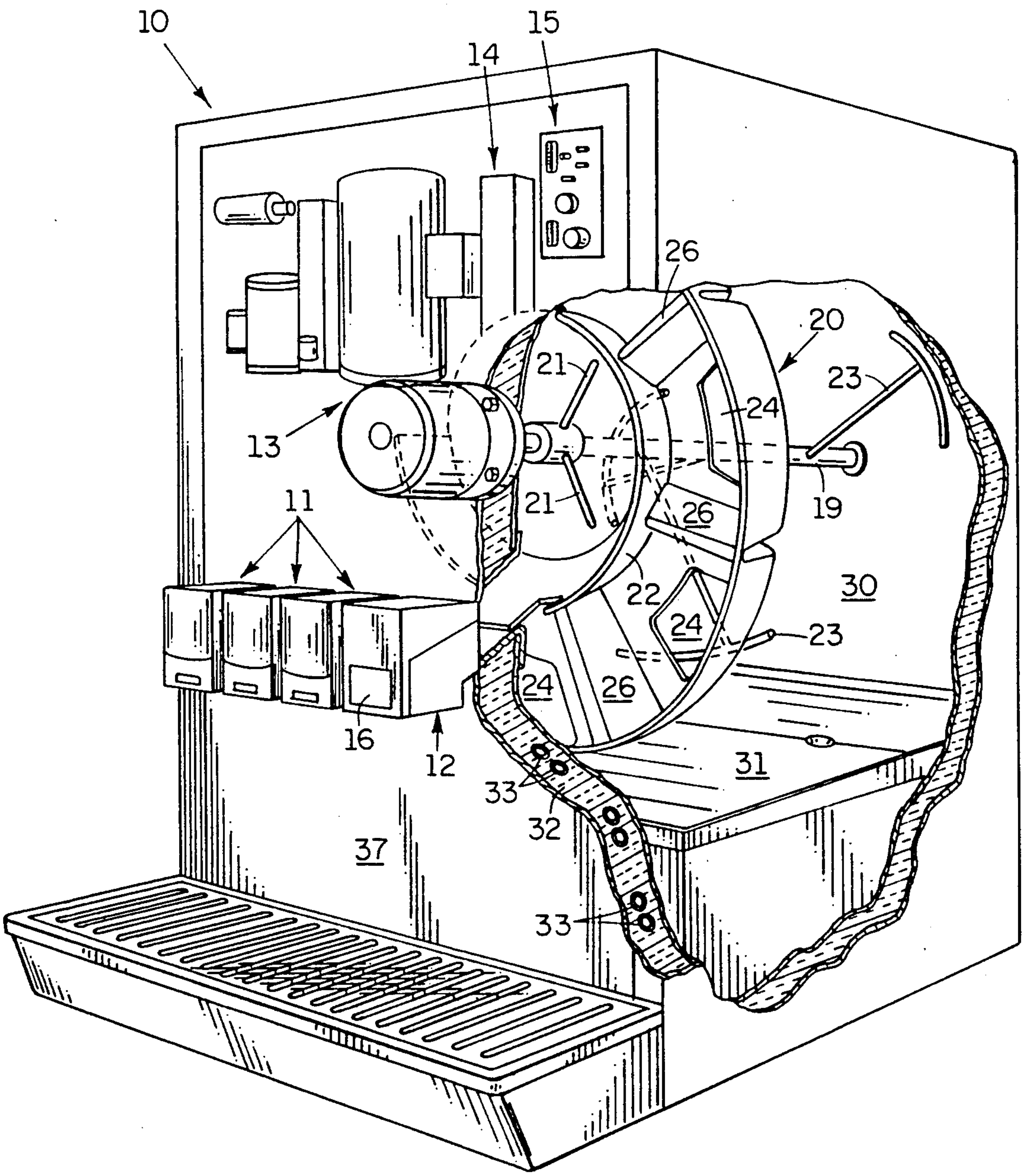
FIG. 1 depicts a perspective view of the combination ice and beverage dispenser of the present invention with a cut-away perspective view into the interior, showing the internal components contained in the preferred embodiment of the ice storage bin.

Referring to FIG. 1, the preferred embodiment of the combination ice and beverage dispenser is generally depicted by numeral 10. On the external face of the dispenser is a plurality of beverage dispenser heads 11, and located adjacent to and at the same height as said beverage dispenser heads 11 is external ice discharge chute 12. Above external ice discharge chute 12 is electric motor 13 which is connected by electrical circuitry with solenoid 14 and P.C. board 15. The cut-away portion of FIG. 1 gives a perspective view into the interior of the ice storage bin generally depicted by numeral 30. Inside bin 30 is shown internal shaft 19 with associated components, rotating tray 20, a plurality of breaker bars 21, cone chute 22, and a plurality of agitators 23. Forming the floor of ice storage bin 30 is cold plate 31. The walls of storage bin 30 are insulated with foam-in-place generally depicted by numeral 32. Molded in situ in said foam insulation 32 is a plurality of product lines 33, all within the confines of front wall 37.

Referring back to the external features of dispenser 10 in FIG. 1, mounted onto external ice discharge chute 12 is membrane switch 16. When an operator desires to dispense ice, a beverage holder is placed below discharge chute 12 and membrane switch 16 is activated by minimal fingertip contact. Activation of switch 16 sends an electric signal to P.C. board 15 which activates solenoid 14 to lift a trap door (shown in FIG. 2 at numeral 17). Simultaneously with activation of solenoid 14, P.C. board 15 also signals motor 13 to rotate shaft 19. Rotation of shaft 19 turns agitators 23 which slowly push stored ice in bin 30 forward into openings 24 connecting the interior of the storage bin with the inside of tray 20.

Figure 2:
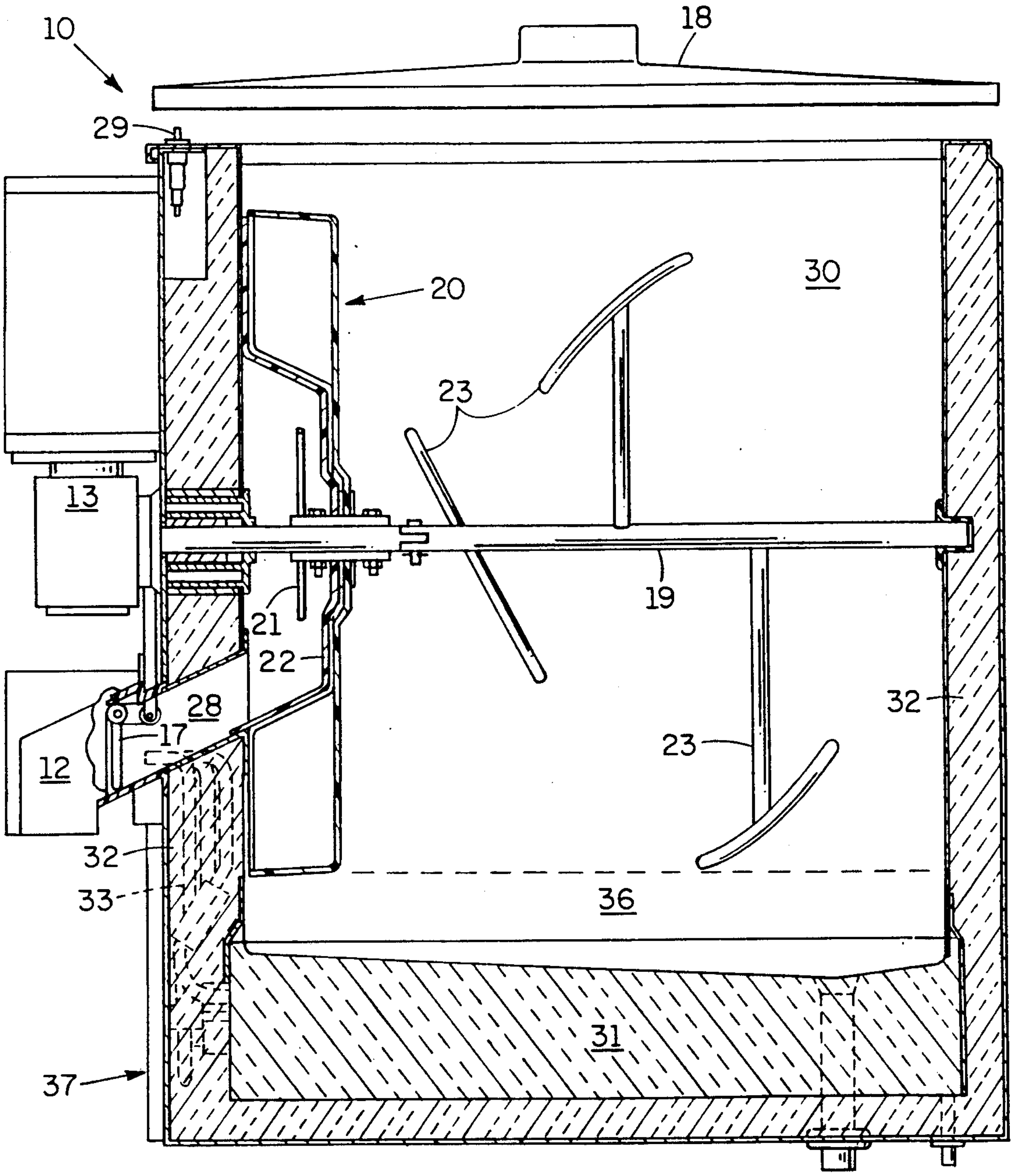
FIG. 2 is a sectional side view displaying the interior of the storage bin and related components that comprise the ice-dispensing system of the preferred embodiment of the present invention.
Figure 3:
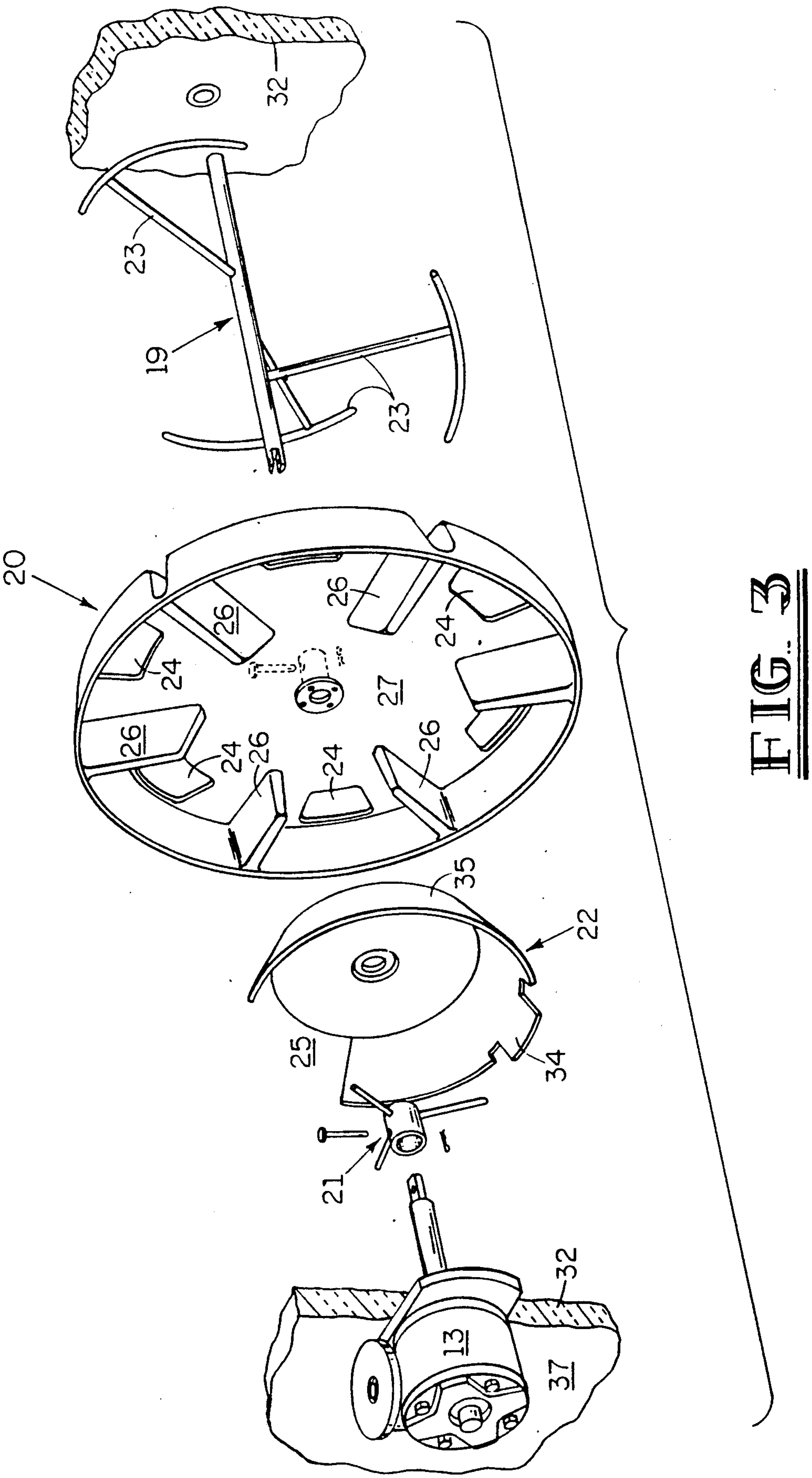
FIG. 3 depicts an exploded view of the internal shaft and related components including an electric motor, a plurality of breaker bars, a cone chute, the preferred embodiment of the rotating tray, and a plurality of agitators, all connected by pin means.

Referring to FIG. 2, motor 13 turns shaft 19 which rotates tray 20. This rotation brings ice up from the lower portions of bin 30 towards the apex of rotating tray 20 which is well above the height of external discharge chute 12. Referring to FIG. 3, an exploded perspective view of the associated components of shaft 19 is depicted, showing cone chute 22 with a cut-away segment 25 at an upper quadrant. Rotating tray 20 is shown with a plurality of molded vanes 26 which rise perpendicularly from circular base portion 27. Openings 24 communicate the inside of tray 20 with storage bin 30. Molded vanes 26, circular base portion 27, and the rim portion 35 of cone chute 22 form wedge-shaped cavities which carry ice pushed through openings 24 up towards the apex of tray 20. When ice reaches cut-away segment portion 25 of cone chute 22, the force of gravity drops said ice into the confines of cone chute 22.

Referring back to FIG. 2, within the confines of cone chute 22, breaker bars 21 further rotate the ice and push it down wall chute 28 which forms a connection with the external discharge chute 12 through the front wall 37 of the dispenser. Trap door 17 separates wall chute 28 from external discharge chute 12. Since trap door 17 remains open while membrane switch 16 is activated, ice is freely discharged past it and through to external discharge chute 12 and down into a waiting beverage holder. When the operator deactivates membrane switch 16, trap door 17 closes and simultaneously stops motor 13, along with shaft 19 and all components inside storage bin 30 mounted onto shaft 19.

When the level of ice in storage bin 30 drops sufficiently low to require refilling of the bin, lid 18 is lifted for access into the bin. Lifting of lid 18 activates interlock switch 29 which shuts off motor 13 should it be operational while lid 18 is open. This prevents any accidental injury that might occur to an operator either during refilling or during routine cleaning and maintenance of internal components.

Referring again to FIG. 2, cold plate 31 is shown forming the floor of ice bin 30. Within cold plate 31 is a plurality of product lines 33 shown in transverse sections. A layer of ice 36, distinguished with a phantom line, is allowed to cover cold plate 31 undisturbed by agitators 23 and tray 20. This layer of ice cools cold plate 31 which chills product lines 33 while within the cold plate. However, product lines 33 extend beyond cold plate 31 and rise vertically to the external front face of dispenser 10. In this region, beyond the confines of cold plate 31, product lines 33 have the potential of warming up, which could result in an occasional warm beverage being dispensed. Foam-in-place 32 within the front wall 37 insulates the product lines and prevents this possibility of warming.

Figure 4:
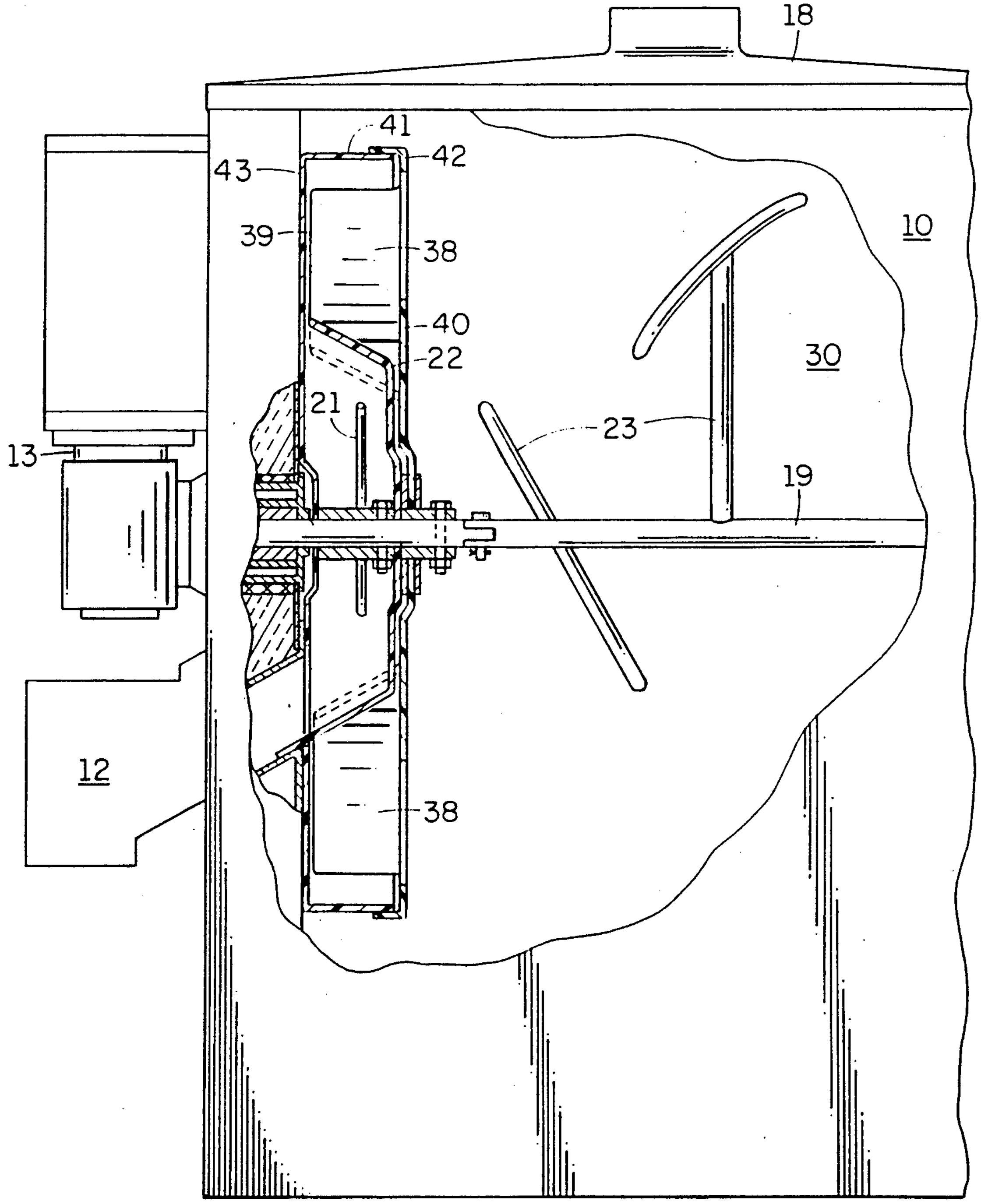
FIG. 4 a side cut-away view of another embodiment of the present invention.

Referring to FIG. 4, another embodiment of the rotating tray is shown. This embodiment is of a two-piece molded construction, the first piece generally designated with the numeral 43 and the second piece by the numeral 42. First piece 43 has a first circular base portion 39 and a circular flange 41 which is contigous with the outer circumference of first circular base portion 41 and extends at a ninty-degree angle from said base portion 41 into the interior of storage bin 30.

The second piece 42 is comprised of a plurality of vanes 38 which rise perpendicularily from a second circular base portion 40. A plurality of wedge-shaped pocket compartments are formed with first circular base portion 39 as the floor, rim portion of cone chute 22 forming an inner circular wall, circular flange 41 forming an outer circular wall, second circular base portion 40 forming the ceiling, and the plurality of vanes 38 forming walls dividing said pockets.

Thus, the present invention is well-suited to carry out the objects and attain the ends and advantages mentioned above as well as those inherent therein. While the preferred embodiment of the present invention has been described for the purposes of this disclosure, changes in the design and arrangements of features can be made by those skilled in the art, which changes are encompassed within the spirit of this invention as defined by the appended claims.

What is claimed is:

1. A combination ice and beverage dispenser comprising:

an enclosure for ice storage;

an ice discharge means communicating between the interior and exterior of said enclosure;

a circular lifting means comprising a circular rotating tray and a stationary cone chute mounted in the center of said circular rotation tray, a plurality of vanes inside said tray extending axially toward said cone chute, said cone chute having an opening therein communicating with the inside of said rotating tray; and a means for rotating said circular rotating tray such that ice deposited on said vanes is elevated from a lowermost portion of said enclosure for discharge through said opening in said cone chute.

2. The combination ice and beverage dispenser of claim 1 further comprising:

a means for agitating ice forward towards said circular lifting means such that ice is deposited from said enclosure into said circular lifting means, said means for agitating ice designed to be activated into motion simultaneously with activation of said means for rotating said circular rotating tray.

3. The combination ice and beverage dispenser of claim 2 wherein:

said ice discharge means comprises a wall chute, a trap door, and an external discharge chute, said trap door being interposed between said wall chute and said external discharge chute; and said means for agitating ice, said means for rotating said circular rotating tray and said trap door designed to be activated into motion simultaneously by a single activation source.

4. The combination ice and beverage dispenser of claim 3 wherein said means for agitating ice is independently activated into motion at time intervals by said single activation source without activation of said means for rotating said circular rotating tray and without activation of said trap door.

5. The combination ice and beverage dispenser of claim 1 wherein said enclosure is comprised of a bottom, four side walls substantially and uniformly perpendicular to said bottom, and a removable cover.

6. The combination ice and beverage dispenser of claim 5 wherein said bottom of said enclosure support a cold plate, said cold plate comprised of an efficient thermal transfer metal, said efficient thermal transfer metal cast with a plurality of product lines molded therein such that cooling of said cold plate chills said product lines.

7. The combination ice and beverage dispenser of claim 5 wherein said four side walls of said enclosure each have cavities filled with foam-insulating means with at least one of said four side walls having a plurality of product lines positioned therein, said plurality of product lines being embedded in said foam-insulating means.

8. A combination ice and beverage dispenser, comprising:

an enclosure for ice storage, said enclosure being comprised of a bottom, four side walls of substantially uniform height, and a removable cover, said bottom being planar and uniformly perpendicular to said side walls;

a wall chute projecting through at least one of said side walls, said wall chute communicating with an external dispensing chute and a trap door interposed between said wall chute and said external dispensing chute;

a lifting means located adjacent to at least one of said side walls, said lifting means comprising a circular rotating tray of a diameter substantially encompassing the entire height and width of said side walls and a stationary cone chute resting within the centermost portion of said circular rotating tray, such that said enclosure communicates with said circular rotating tray, said circular rotating tray communicates with said stationary cone chute, said stationary cone chute communicates with said wall chute to the exterior of said enclosure via said external dispensing chute.

a means for agitating ice stored within said enclosure towards said circular rotating tray for depositing said ice through openings in said circular rotating tray from the lower regions of said enclosure; and a means for rotating said circular rotating tray such that said circular rotating tray elevates said deposited ice from said lower regions of said enclosure up to said stationary cone chute so that said ice is dispensed out from the interior to the exterior of said enclosure through said wall chute and said external dispensing chute.

9. The combination ice and beverage dispenser of claim 8 wherein said circular rotating tray comprises:

a circular planar base member having a plurality of punched-out bordering edges;

a plurality of vanes connected at a perpendicular angle to said circular planar base member; and a circular flange member connected to the entire outer circumference of said circular planar base member such that a plurality of pocket compartments are formed by said plurality of vanes, said circular flange, and said circular planar base member with each of said plurality of wedge-shaped pockets having at least one of said plurality of punched-out bordering edges.

10. The combination ice and beverage dispenser of claim 8 wherein said circular rotating tray comprises:

a first circular planar base member having a plurality of punched-out bordering edges;

a plurality of vanes connected at a perpendicular angle to said first circular planar base member; and a second circular planar base member having a circular flange member connected to the entire outer circumference of said second circular planar base member such that a plurality of wedge-shaped pockets are formed by said first circular planar base member, said plurality of vanes, said circular flange, and said second circular planar base member with each of said plurality of wedge-shaped pockets having at least one of said plurality of punched-out bordering edges.

11. The combination ice and beverage dispenser of claim 8 wherein said trap door, said means for agitating ice and said means for rotating said circular rotating tray are all simultaneously activated into motion by a single activation source.

12. The combination ice and beverage dispenser of claim 8 wherein said means for agitating ice comprises:

an elongated shaft member; and a plurality of agitating members mounted onto said elongated shaft member, said elongated shaft member and said plurality of agitating members coated with a poor thermal conducting material such that ice cannot adhere to said means to agitate ice.

13. The combination ice and beverage dispenser of claim 8 wherein said stationary cone chute resting within said centermost portion of said circular rotating tray comprises:

a circular base portion; and a raised rim portion connected to a substantial part of the circumference of said circular base portion, with at least one upper quadrant of said raised rim portion missing such that ice can fall through said one upper quadrant.

* * * * *